(12) United States Patent
Kim et al.

(10) Patent No.: US 10,671,314 B2
(45) Date of Patent: Jun. 2, 2020

(54) METHOD OF COPYING DATA BETWEEN OPEN-CHANNEL SOLID STATE DRIVES (SSDS) AND AN APPARATUS PERFORMING THE SAME

(71) Applicant: Circuit Blvd., Inc., Sunnyvale, CA (US)

(72) Inventors: Bumsoo Kim, Saratoga, CA (US); Young Tack Jin, Cupertino, CA (US)

(73) Assignee: CIRCUIT BLVD., INC., Sunnyvale, CA (US)

( * ) Notice: Subject to any disclaimer, the term of this patent is extended or adjusted under 35 U.S.C. 154(b) by 0 days.

(21) Appl. No.: 16/003,060

(22) Filed: Jun. 7, 2018

(65) Prior Publication Data
US 2019/0377495 A1    Dec. 12, 2019

(51) Int. Cl.
*G06F 12/02* (2006.01)
*G06F 3/06* (2006.01)

(52) U.S. Cl.
CPC ............ *G06F 3/065* (2013.01); *G06F 3/0604* (2013.01); *G06F 3/0683* (2013.01); *G06F 12/0246* (2013.01)

(58) Field of Classification Search
None
See application file for complete search history.

(56) References Cited

U.S. PATENT DOCUMENTS

| 9,348,518 | B2 * | 5/2016 | Fields, Jr. | G06F 3/0611 |
| 2008/0082735 | A1 * | 4/2008 | Shiga | G06F 13/28 711/103 |
| 2012/0191903 | A1 * | 7/2012 | Araki | G06F 12/0246 711/103 |

OTHER PUBLICATIONS

Tanenbaum, "Structured Computer Organization", (c) 1984 Prentice Hall, p. 10-12.*
"Open-Channel Solid State Drives NVMe Specification", Revision 1.2, Apr. 2016, 24 pages.
"Open-Channel Solid State Drives Specification", Revision 2.0, Jan. 29, 2018, pp. 1-28.
Jhuyeong Jhin et al., "Implementation of Open-channel SSD Emulator supporting LightNVM", 2016, pp. 1228-1230, KR.

* cited by examiner

*Primary Examiner* — Brian R Peugh
(74) *Attorney, Agent, or Firm* — Cantor Colburn LLP

(57) ABSTRACT

Disclosed is a method of copying data between open-channel solid state drives (SSDs), the method including transmitting, by a host, a read command to a source SSD, performing, by the source SSD, a read operation on data stored in the source SSD, in response to the read command, specifying, by the source SSD, an address of a data buffer of a destination SSD, in response to the read command, copying, by the source SSD, the stored data to the specified address of the data buffer, and storing, by the destination SSD, the data copied from the source SSD.

7 Claims, 7 Drawing Sheets

METHOD OF COPYING DATA BETWEEN OPEN-CHANNEL SOLID STATE DRIVES (SSDS) AND AN APPARATUS PERFORMING THE SAME

BACKGROUND

1. Field

One or more example embodiments relate to a method of copying data between open-channel solid state drives (SSDs) and an apparatus performing the same.

2. Description of Related Art

With the gradual improvement of the performance of a processor, demanding specifications for a memory are increasing. A disk-based storage medium, for example, a hard disk drive (HDD), exhibits an excellent performance in successive address access. However, the performance decreases when accessing a random address.

Thus, a non-volatile memory (NVM) having advantages of a fast speed of response and a low power consumption is used for many computing systems as a storage device that substitutes for the HDD. The NVM includes, for example, a flash memory-based solid state drive (SSD).

To improve a bandwidth of such an NVM storage device, studies and developments based on a parallel structure have been conducted. For example, when using a multi-channel structure or multi-way structure for the NVM storage device, the bandwidth improves.

However, in this example, a bandwidth of a host interface used in the HDD-based storage device limits the bandwidth of the NVM storage device. Thus, a peripheral component interconnect express (PCIe) interface was used as the host interface of the NVM storage device. Further, a new NVM express (NVMe) interface was invented for a PCIe interface-based SSD.

Unlike an existing interface that defines a command set and an optimized register and operates with a single input/output (I/O) queue, the NVMe interface has a multi-queue structure and enables an individual queue to be used for each application, thereby increasing I/O parallelism. Further, the NVMe interface supports completion processing with respect to multiple queues/multiple commands with a single interrupt occurring in an SSD.

SUMMARY

According to an aspect, there is provided a copying method including performing, by a source solid state drive (SSD), a read operation on data stored in the source SSD, in response to a read command transmitted from a host, specifying, by the source SSD, an address of a data buffer of a destination SSD, in response to the read command, copying, by the source SSD, the stored data to the specified address of the data buffer, and storing, by the destination SSD, the data copied from the source SSD.

The copying method may further include transmitting, by the source SSD, a result of the read operation to the host.

The copying method may further include transmitting, by the host, an initialize command to the destination SSD, and performing, by the destination SSD, an initialize operation in response to the initialize command.

The performing of the initialize operation may include initializing, by the destination SSD, the data buffer and a control logic associated with the data buffer.

The performing of the initialize operation may be performed before transmitting the read command.

The storing may include starting to store the copied data when a space of the data buffer is full.

The storing may include transmitting, by the host, a write command to the destination SSD, and storing, by the destination SSD, the copied data in response to the write command.

The copying method may further include transmitting, by the destination SSD, a result of the storing to the host.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
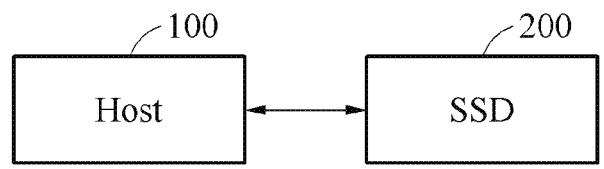
FIG. 1 is a block diagram illustrating a solid state drive (SSD) system according to an example embodiment.

Hereinafter, reference will now be made in detail to examples with reference to the accompanying drawings, wherein like reference numerals refer to like elements throughout. Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

FIG. 1 is a block diagram illustrating a solid state drive (SSD) system according to an example embodiment.

Referring to FIG. 1, an SSD system may include a host 100 and an SSD device 200.

The host 100 may transmit a command to the SSD device 200 based on a command from a user of the SSD system. The SSD device 200 may perform an operation based on the command received from the host 100. For example, the SSD device 200 may perform an operation of reading, writing, or erasing.

The SSD device 200 may not include firmware of a flash translation layer (FTL). For example, the SSD device 200 may be an open-channel SSD device. That is, the SSD device 200 may provide the host 100 with information related to internal parallelism of the SSD device 200 such that the host 100 may perform physical mapping on the SSD device 200. THe internal parallelism of the SSD device 200 may be expressed as shown in Table 1 according to versions of open-channel SSD.

Table 1 represents internal parallelism of the SSD device 200 with respect to physical page addresses (PPAs) of Version 1.2 and Version 2.0 of open-channel SSD.

TABLE 1

| OCSSD ver | PPA(64 bit) | | | | | |
|---|---|---|---|---|---|---|
| 1.2 | ch | lun | pln | blk | pg | sect |
| 2.0 | group | pu | chunk | | | logical block |

In a case in which the SSD device 200 complies with Version 1.2 of open-channel SSD, the PPA of the SSD device 200 may include a channel (ch), a logical unit number (lun), a plane (pin), a block (blk), a page (pg), and a sector (sect).

In a case in which the SSD device 200 complies with Version 2.0 of open-channel SSD, the PPA of the SSD device 200 may include a group, a parallel unit (pu), a chunk, and a logical block. In this example, the group may correspond to the channel, the parallel unit may correspond to the logical unit number, the chunk may correspond to the plane and the block, and the logical block may correspond to the page and the sector.

The host 100 and the SSD device 200 may communicate with each other using a software interface. In this example, the software interface may be a non-volatile memory express (NVMe)-based interface. That is, the host 100 may transmit a command to the SSD device 200 through a submission queue. A controller of the SSD device 200 may perform an operation by referring to the submission queue. The controller of the SSD device 200 may report a result of performing the operation to the SSD device 200 through a completion queue.

The submission queue may include a 64-byte submission queue entry including a metadata pointer (MPTR), a data pointer (DPTR), a starting logical block addressing (SLBA), and a number of logical blocks (NLB). The completion queue may include a 16-byte completion queue entry including a status code type (SCT) and a status code (SC).

Admin commands that the host 100 transmits to the SSD device 200 through the submission queue in Version 1.2 of open-channel SSD may be represented as shown in Table 2.

TABLE 2

| Opcode (07) Generic | Opcode (06:02) Function | Opcode (01:00) Data Transfer | NVMe Opcode | O/M | Command |
|---|---|---|---|---|---|
| 1b | 110 00b | 10b | E2h | M | Device Identification |
| 1b | 110 00b | 01b | F1h | O | Set Bad Blocks Table |
| 1b | 110 00b | 10b | F2h | O | Get Bad Blocks Table |

The host 100 may enumerate an inner configuration of the SSD device 200 based on the Admin commands of Table 2, and manage an internal bad block table.

Input/output (I/O) commands that the host 100 transmits to the SSD device 200 through the submission queue in Version 1.2 of open-channel SSD may be represented as shown in Table 3.

TABLE 3

| Opcode (07) Generic | Opcode (06:02) Function | Opcode (01:00) Data Transfer | NVMe Opcode | O/M | Command |
|---|---|---|---|---|---|
| 1b | 001 00b | 00b | 90h | M | Physical Block Erase |
| 1b | 001 00b | 01b | 91h | M | Physical Page Address Write |
| 1b | 001 00b | 10b | 92h | M | Physical Page Address Read |
| 1b | 001 01b | 01b | 95h | O | Physical Page Address Raw Write |
| 1b | 001 01b | 10b | 96h | O | Physical Page Address Raw Read |

The host 100 may perform an operation of erasing, writing, or reading based on the I/O commands of Table 3.

Admin commands that the host 100 transmits to the SSD device 200 through the submission queue in Version 2.0 of open-channel SSD may be represented as shown in Table 4.

TABLE 4

| Opcode (07) Generic | Opcode (06:02) Function | Opcode (01:00) Data Transfer | NVMe Opcode | O/M | Namespace Identifier Used | Command |
|---|---|---|---|---|---|---|
| 1b | 110 00b | 10b | E2h | M | Yes | Geometry |
| 0b | 000 00b | 10b | 02h | M | Yes | Get Log Page - Chunk Information |
| 0b | 000 10b | 01b | 09h | M | Yes | Set Features - Media Feedback |
| 0b | 000 10b | 10b | 0Ah | M | Yes | Get Features - Media Feedback |

The host 100 may enumerate an inner configuration of the SSD device 200 based on the Admin commands of Table 4, and read a state of an individual chuck.

I/O commands that the host 100 transmits to the SSD device 200 through the submission queue in Version 2.0 of open-channel SSD may be represented as shown in Table 5.

TABLE 5

| Opcode (07) Generic | Opcode (06:02) Function | Opcode (01:00) Data Transfer | NVMe Opcode | O/M | Command |
|---|---|---|---|---|---|
| 0b | 000 00b | 01b | 01h | M | Write (From NVMe 1.3 specification) |
| 0b | 000 00b | 10b | 02h | M | Read (From NVMe 1.3 specification) |
| 0b | 000 10b | 01b | 09h | M | Data Management (From NVMe 1.3 specification) |
| 1b | 001 00b | 00b | 90h | O | Vector Chunk Reset |
| 1b | 001 00b | 01b | 91h | O | Vector Chunk Write |
| 1b | 001 00b | 10b | 92h | O | Vector Chunk Read |
| 1b | 001 00b | 11b | 93h | O | Vector Chunk Copy |

The host 100 may perform an operation of data management, resetting, writing, reading, or copying based on the I/O commands of Table 5.

Figure 2:
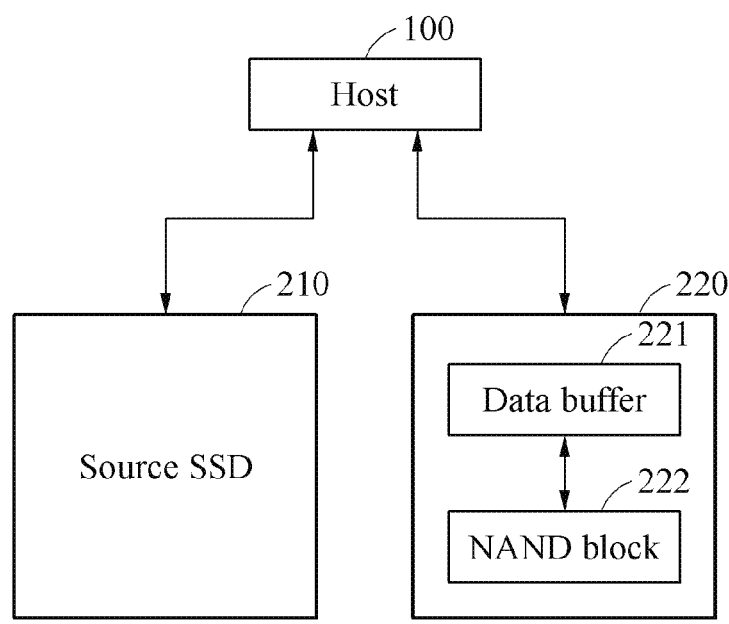
FIG. 2 illustrates an operation of an SSD device according to an example embodiment.

FIG. 2 illustrates an operation of an SSD device according to an example embodiment.

Referring to FIG. 2, the host 100 may communicate with a source SSD 210 and a destination SSD 220 separately. The source SSD 210 and the destination SSD 220 may be individual SSD devices which are substantially the same as the SSD device 200 of FIG. 1. The description of the host 100 and the SSD device 200 provided with reference to FIG. 1 may be applicable to the host 100 and the SSDs 210 and 220 of FIG. 2.

The source SSD 210 may be an SSD in which data to be copied is present. The destination SSD 220 may be an SSD in which data copied from the source SSD 210 is to be stored. The destination SSD 220 may include a data buffer 221 and a NAND block 222. The data buffer 221 may refer to a buffer included in a controller memory buffer (CMB) of the destination SSD 220.

The source SSD 210 may read data stored in the source SSD 210, in response to a read command from a host. The host may transmit the command to the source SSD 210 using a submission queue. In a case in which the SSD device 200 complies with Version 1.2 of open-channel SSD, the host may command the SSD device 200 to read data by referring to Table 5. For example, the host may command the source SSD 210 to read data using a non-volatile memory express operation code (NVMe Opcode) of 92h. The source SSD 210 may transmit a result of the read operation to the host using a completion queue.

The source SSD 210 may specify an address of the data buffer 221 to which data is to be copied, in response to the read command from the host. The source SSD 210 may copy data to the specified address of the data buffer 221 based on a copy command from the host.

A plurality of source SSDs 210 may be implemented. For example, the plurality of source SSDs 210 may copy respective data to the destination SSD 220 based on the command from the host.

The destination SSD 220 may store the data copied from the source SSD 210 in the data buffer 221. For example, the data buffer 221 may temporarily store the copied data.

The destination SSD 220 may move the data stored in the data buffer 221 to the NAND block 222. An operation of the destination SSD 220 storing data in the NAND block 222 may be construed as a write operation.

For example, the destination SSD 220 may move the data to the NAND block 222 when the data buffer 221 is full. The data buffer 221 may be full of the data copied from the source SSD 210. The destination SSD 220 may write the data in the NAND block 222, and report a result or state of the writing to the host. This may be an example in which the source SSD 210 copies data when the data buffer 221 is initialized (or reset). The destination SSD 220 may initialize the data buffer 221 and a control logic associated with the data buffer 221 in response to an initialize command received from the host.

In another example, the destination SSD 220 may move the data of the data buffer 221 to the NAND block 222 in response to a write command received from the host. The destination SSD 220 may write the data in the NAND block 222, and report a result or state of the writing to the host.

For ease of description, a case in which the SSD device 200 complies with Version 2.0 of open-channel SSD was described above. However, example embodiments are not limited thereto. The example embodiments may also be applied to a case in which the SSD device 200 complies with Version 2.0 of open-channel SSD.

Further, the operation of each of the source SSD 210 and the destination SSD 220 may be performed by a controller belonging to each SSD.

Hereinafter, the above example embodiments will be described with reference to the drawings.

Figure 3:
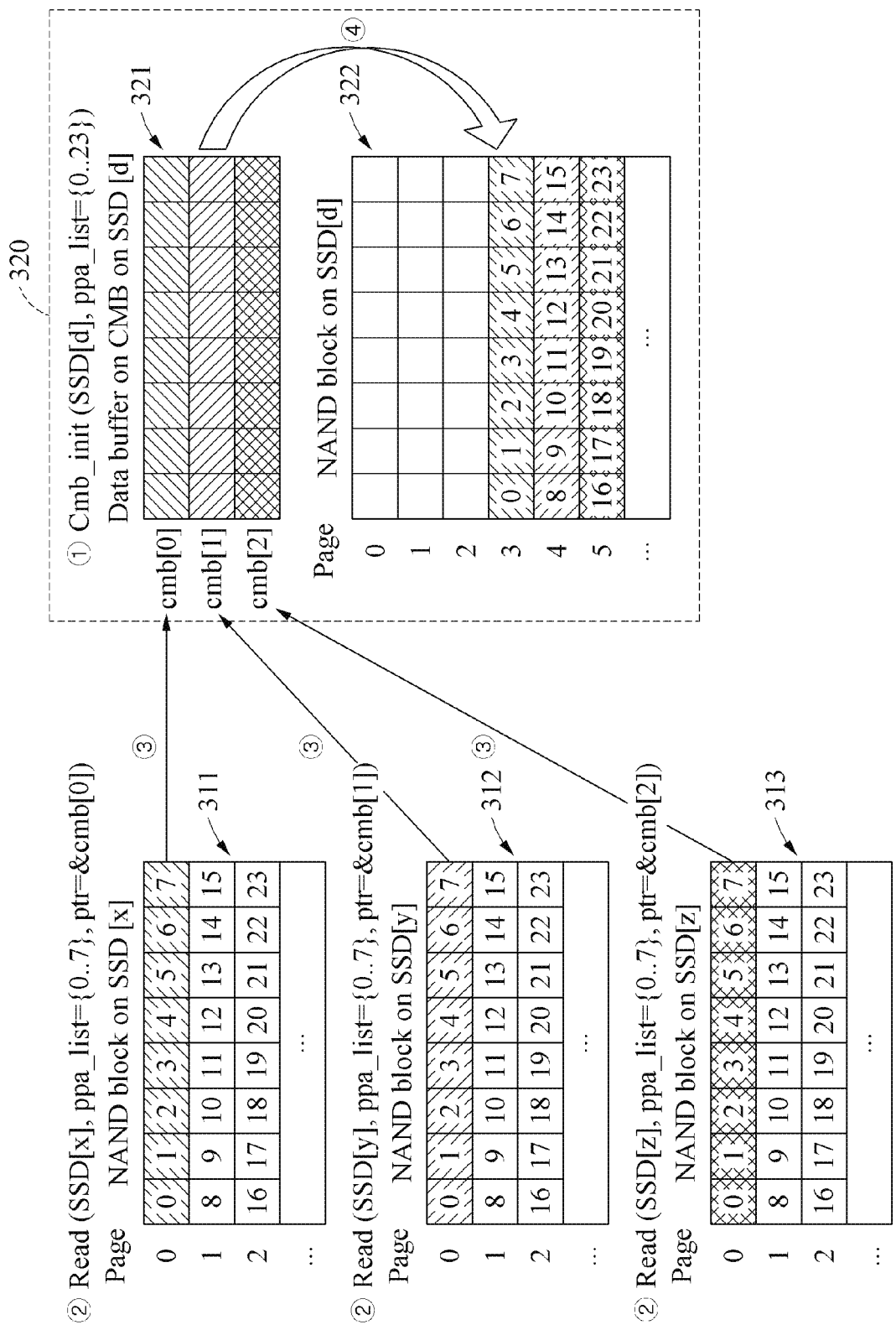
FIG. 3 illustrates an operation of copying data between SSD devices.

FIG. 3 illustrates an operation of copying data between SSD devices.

Referring to FIG. 3, operations of a plurality of source SSDs copying data to a destination SSD 320 are illustrated. For example, the plurality of source SSDs may include a source SSD x 311, a source SSD y 312, and a source SSD z 313.

The destination SSD 320 may include a data buffer 321 and a NAND block 322.

A host may transmit an initialize command to the destination SSD 320. The destination SSD 320 may initialize the data buffer 321 and a control logic associated with the data buffer 321, in response to the initialize command from the host. For example, the initialize command may be cmb_init (SSD[d], ppa_list={0 . . 23}). Here, cmb_init denotes the initialize command, SSD[d] denotes the destination SSD 320, and ppa_list denotes an array of a plurality of PPAs.

Thus, a zeroth sector to a twenty-third sector of the data buffer 321 may be initialized. In a case in which the SSD device 200 complies with Version 2.0 of open-channel SSD, a zeroth logical block to a twenty-third logical block of the data buffer 321 may be initialized.

The host may transmit read commands to the plurality of source SSDs. The plurality of source SSDs may read data stored in respective NAND blocks, in response to the read commands from the host. In this example, the read operations of the plurality of source SSDs may be performed after an initialize operation of the destination SSD 320.

For example, the host may transmit a read command of read(SSD[x], ppa_list={0 . . 7}, ptr=&cmb[0]) to the source SSD x 311. Here, read denotes the read command, SSD[x] denotes the source SSD x 311, ppa_list={0 . . 7} denotes PPAs of a zeroth sector to a seventh sector, and ptr=&cmb[0] denotes a zeroth region cmb[0] of the data buffer 321, which is a pointer corresponding to a destination of data copying. The pointer may refer to an address.

The host may transmit a read command of read(SSD[y], ppa_list={0 . . 7}, ptr=&cmb[1]) to the source SSD y 312. Here, read denotes the read command, SSD[y] denotes the source SSD y 312, ppa_list={0 . . 7} denotes PPAs of a zeroth sector to a seventh sector, and ptr=&cmb[1] denotes a first region cmb[1] of the data buffer 321.

The host may transmit a read command of read(SSD[z], ppa_list={0 . . 7}, ptr=&cmb[2 ]) to the source SSD z 313. Here, read denotes the read command, SSD[z] denotes the source SSD z 313, ppa_list={0 . . 7} denotes PPAs of a zeroth sector to a seventh sector, and ptr=&cmb[2] denotes a second region cmb[2] of the data buffer 321.

The plurality of source SSDs may specify addresses to which data is to be copied in the data buffer 321, in response to the read commands from the host. For example, the source SSD x 311 may specify an address to the zeroth region cmb[0] of the data buffer 321, the source SSD y 312 may specify an address to the first region cmb[1] of the data buffer 321, and the source SSD z 313 may specify an address to the second region cmb[2] of the data buffer 321.

The plurality of source SSDs may copy the data to the specified addresses of the data buffer 321. The data buffer 321 may refer to a buffer in which data is stored temporarily.

The plurality of source SSDs may perform operations in response to the read commands, and report results or states of the operations to the host. In this example, the plurality of source SSDs may use completion queues.

The destination SSD 320 may store the copied data in the NAND block 322 when a space of the data buffer 321 is full. For example, the destination SSD 320 may move the data from the data buffer 321 to the NAND block 322. In this example, the destination SSD 320 may store the data of the data buffer 321 in the NAND block 322, without changing an order of the data. In detail, the destination SSD 320 may write data of the zeroth region cmb[0] of the data buffer 321 on a third page of the NAND block 322. Further, the destination SSD 320 may write data of the first region cmb[1] of the data buffer 321 on a fourth page of the NAND block 322. The destination SSD 320 may write data of the second region cmb[2] of the data buffer 321 on a fifth page of the NAND block 322.

The destination SSD 320 may report a result or state of the writing in the NAND block 322 to the host.

The plurality of source SSDs and the destination SSD 320 may perform a copyback of data therebetween, rather than through the host, thereby reducing a burden of a system memory bus.

For ease of description, FIG. 3 illustrates an example in which an SSD device is implemented as a triple-layer cell (TLC). However, the example embodiments are not limited thereto. The SSD device may be implemented as a single-layer cell (SLC), a multi-layer cell (MLC), or a quad-layer cell (QLC).

Figure 4:
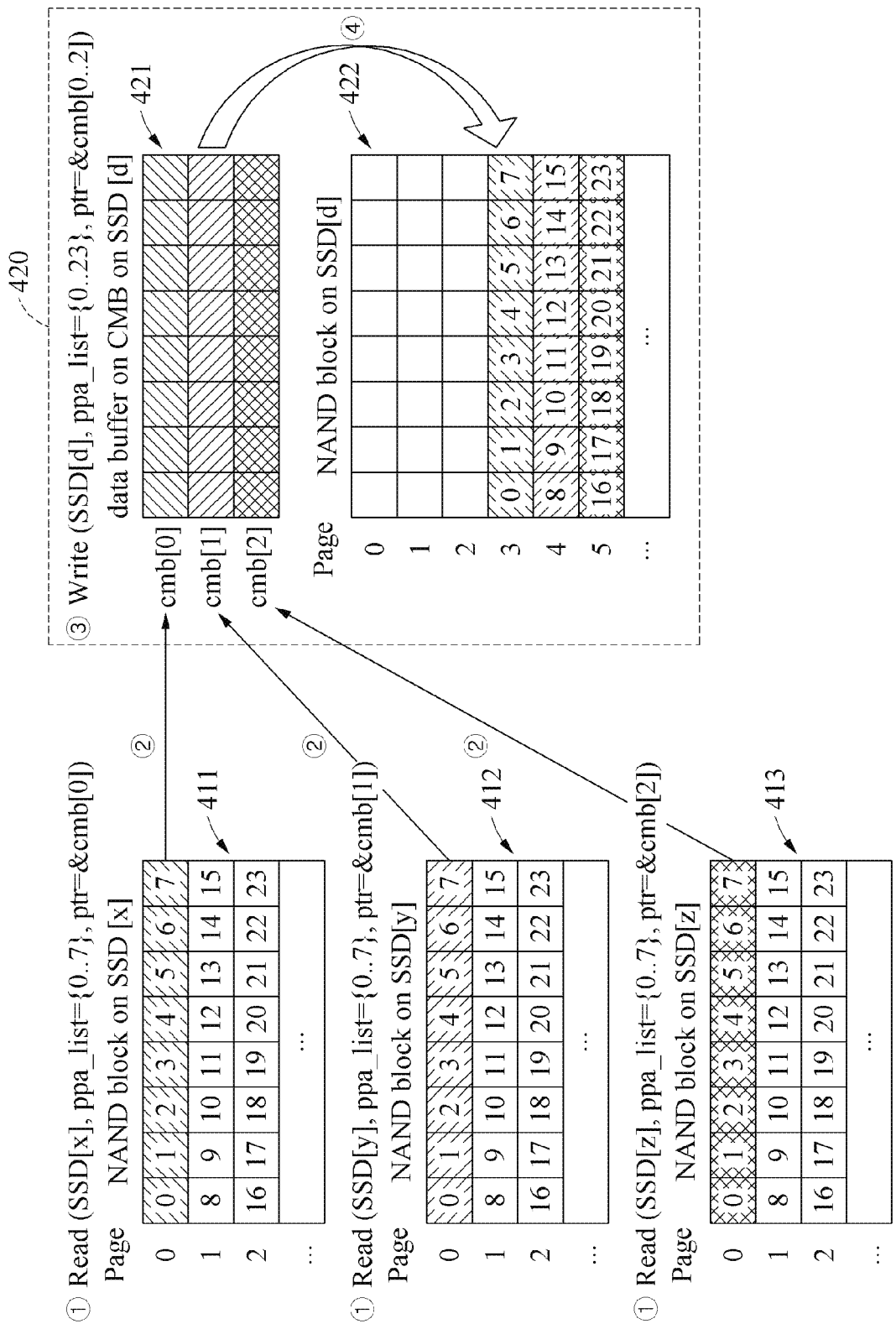
FIG. 4 illustrates an operation of copying data between SSD devices.

FIG. 4 illustrates an operation of copying data between SSD devices.

Referring to FIG. 4, operations of a plurality of source SSDs copying data to a destination SSD 420 are illustrated. For example, the plurality of source SSDs may include a source SSD x 411, a source SSD y 412, and a source SSD z 413.

The destination SSD 420 may include a data buffer 421 and a NAND block 422.

The host may transmit read commands to the plurality of source SSDs. The plurality of source SSDs may read data stored in respective NAND blocks, in response to the read commands from the host. In this example, the read operations of the plurality of source SSDs may be performed after an initialize operation of the destination SSD 420.

For example, the host may transmit a read command of read(SSD[x], ppa_list={0 . . . 7}, ptr=&cmb[0]) to the source SSD x 411. Here, read denotes the read command, SSD[x] denotes the source SSD x 411, ppa_list={0 . . 7} denotes PPAs of a zeroth sector to a seventh sector, and ptr=&cmb[0] denotes a zeroth region cmb[0] of the data buffer 421, which is a pointer corresponding to a destination of data copying. The pointer may refer to an address.

The host may transmit a read command of read(SSD[y], ppa_list={0 . . 7}, ptr=&cmb[1]) to the source SSD y 412. Here, read denotes the read command, SSD[y] denotes the source SSD y 412, ppa_list={0 . . 7} denotes PPAs of a zeroth sector to a seventh sector, and ptr=&cmb[1] denotes a first region cmb[1] of the data buffer 421.

The host may transmit a read command of read(SSD[z], ppa_list={0 . . 7}, ptr=&cmb[2]) to the source SSD z 413. Here, read denotes the read command, SSD[z] denotes the source SSD z 413, ppa_list={0 . . . 7} denotes PPAs of a zeroth sector to a seventh sector, and ptr=&cmb[2] denotes a second region cmb[2] of the data buffer 421.

The plurality of source SSDs may specify addresses to which data is to be copied in the data buffer 421, in response to the read commands from the host. For example, the source SSD x 411 may specify an address to the zeroth region cmb[0] of the data buffer 421, the source SSD y 412 may specify an address to the first region cmb[1] of the data buffer 421, and the source SSD z 413 may specify an address to the second region cmb[2] of the data buffer 421.

The plurality of source SSDs may copy the data to the specified addresses of the data buffer 421. The data buffer 421 may refer to a buffer in which data is stored temporarily.

The plurality of source SSDs may perform operations in response to the read commands, and report results or states of the operations to the host. In this example, the plurality of source SSDs may use completion queues.

The host may transmit a write command to the destination SSD 420. The write command may be write(SSD[d], ppa_l- ist={0 . . 23}, ptr=&cmb[0 . . 2]). Here, write denotes the write command, SSD[d] denotes the destination SSD 420, ppa_list={0 . . 23} denotes PPAs of a zeroth sector to a twenty-third sector, and ptr=&cmb[0 . . 2] denotes a zeroth region cmb[0] to a second region cmb[2] of the data buffer 421.

The destination SSD 420 may store the data stored in the data buffer 421 in the NAND block 422, in response to the write command. For example, the destination SSD 420 may move the data from the data buffer 421 to the NAND block 422.

In this example, the destination SSD 420 may store the data of the data buffer 421 in the NAND block 422 without changing an order of the data. For example, the destination SSD 420 may write data of the zeroth region cmb[0] of the data buffer 421 on a third page of the NAND block 422. Further, the destination SSD 420 may write data of the first region cmb[1] of the data buffer 421 on a fourth page of the NAND block 422. The destination SSD 420 may write data of the second region cmb[2] of the data buffer 421 on a fifth page of the NAND block 422.

The destination SSD 420 may report results or states of the writing in the NAND block 422 to the host.

For ease of description, FIG. 4 illustrates an example in which an SSD device is implemented as a TLC. However, the example embodiments are not limited thereto. The SSD device may be implemented as an SLC, an MLC, or a QLC.

Figure 5:
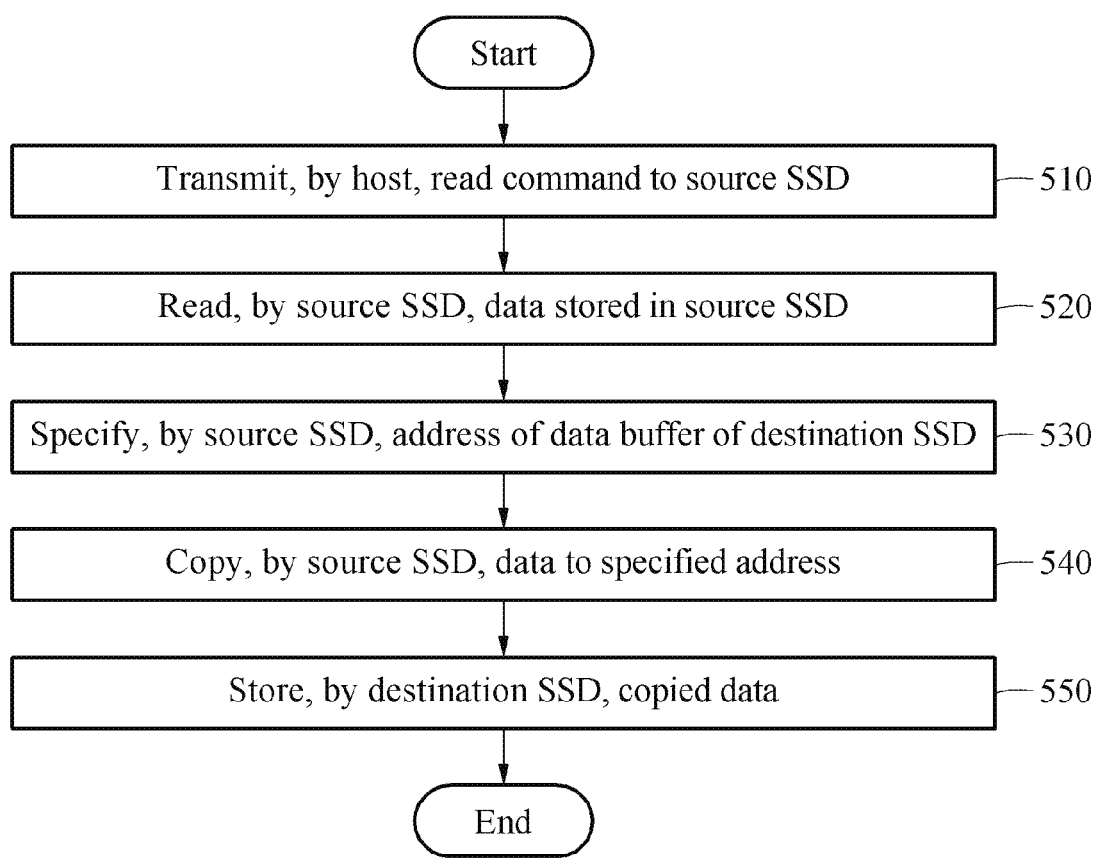
FIG. 5 is a flowchart illustrating a method of copying data between SSD devices.

FIG. 5 is a flowchart illustrating a method of copying data between SSD devices.

Referring to FIG. 5, a method of copying data from a source SSD to a destination SSD in an SSD device is illustrated. A plurality of source SSDs may be implemented.

In operation 510, a host may transmit a read command to a source SSD. In this example, the host may transmit the command using a submission queue. The read command may include a corresponding source SSD, a PPA list, and a pointer.

In operation 520, the source SSD may read data stored in the source SSD, in response to the read command.

In operation 530, the source SSD may specify an address of a data buffer of a destination SSD to which the data is to be copied, in response to the read command.

In operation 540, the source SSD may copy data to the specified address of the data buffer.

In operation 550, the destination SSD may store the data of the data buffer in a NAND block. For example, the destination SSD may move the data of the data buffer to the NAND block. The destination SSD may report a result or state of writing the data to the host. In this example, the destination SSD may use a completion queue.

Figure 6:
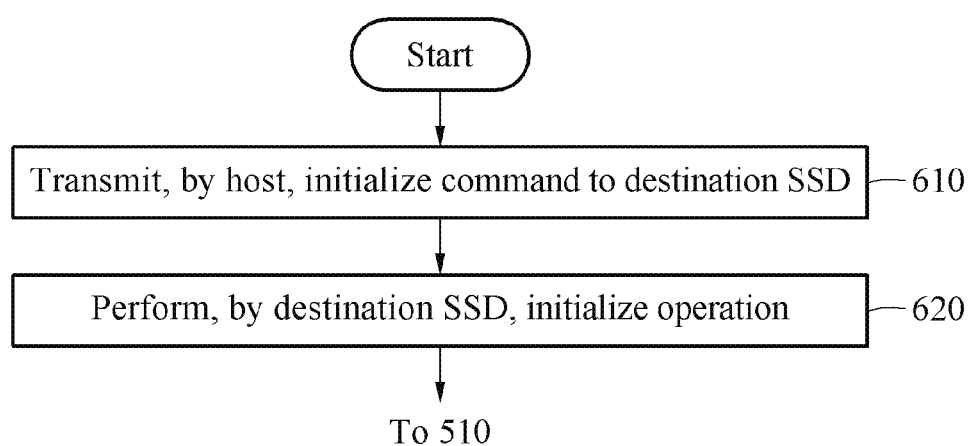
FIG. 6 is a flowchart illustrating a method of copying data between SSD devices.

FIG. 6 is a flowchart illustrating a method of copying data between SSD devices.

Referring to FIG. 6, in operation 610, a host may transmit an initialize command to a destination SSD.

In operation 620, the destination SSD may perform an initialize operation in response to the initialize command. For example, the destination SSD may initialize a data buffer and a control logic associated with the data buffer.

The initialize operation of the destination SSD may be performed before an operation of the host transmitting a read command to a source SSD. That is, after the destination SSD performs the initialize operation, the host may transmit the read command to the source SSD.

In a case in which a space of the data buffer is full, the destination SSD may store data from the data buffer to a NAND block.

The source SSD and the destination SSD may perform a copyback of data therebetween, rather than through the host, thereby enabling operations to be simplified and processed fast.

Figure 7:
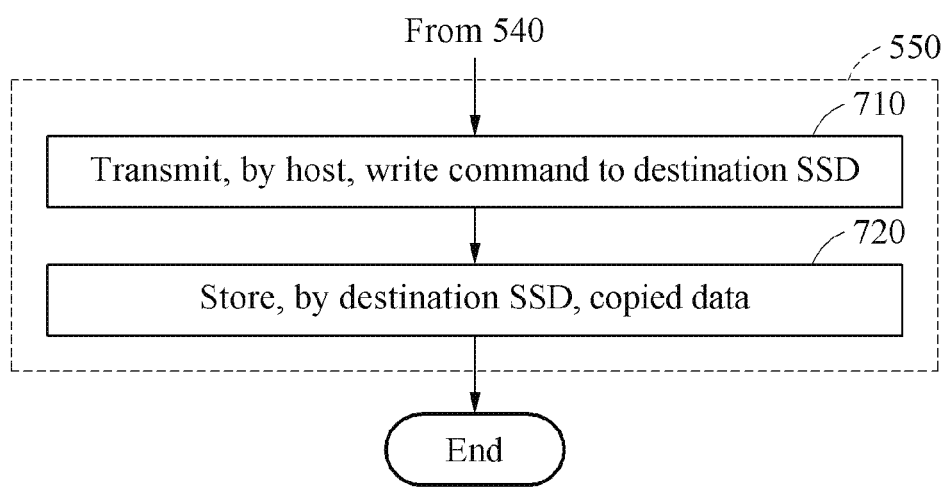
FIG. 7 is a flowchart illustrating a method of copying data between SSD devices.

FIG. 7 is a flowchart illustrating a method of copying data between SSD devices.

Referring to FIG. 7, in operation 710, a host may transmit a write command to a destination SSD. In this example, the host may transmit the command using a submission queue. The write command may include the corresponding destination SSD, a PPA list, and a pointer. The operation of the host transmitting the write command to the destination SSD may be performed after an operation of a source SSD copying data to a data buffer of the destination SSD.

In operation 720, the destination SSD may store data copied to the data buffer in a NAND block. The destination SSD may report a result or state of writing the data to the host. In this example, the destination SSD may use a completion queue.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A copying method, comprising:
   transmitting, by a host, an initialize command to a destination solid state drive (SSD);
   performing, by the destination SSD, an initialize operation in response to the initialize command;
   performing, by a source SSD, a read operation on data stored in the source SSD, in response to a read command transmitted from the host;
   specifying, by the source SSD, an address of a data buffer of a destination SSD, in response to the read command;
   copying, by the source SSD, the stored data to the specified address of the data buffer; and
   storing, by the destination SSD, the data copied from the source SSD, and
   wherein the performing of the initialize operation comprises initialize, by the destination SSD, the data buffer and a control logic associated with the data buffer.

2. The copying method of claim 1, further comprising:
   transmitting, by the source SSD, a result of the read operation to the host.

3. The copying method of claim 1, wherein the performing of the initialize operation is performed before transmitting the read command.

4. The copying method of claim 1, wherein the storing comprises starting to store the copied data when a space of the data buffer is full.

5. The copying method of claim 1, wherein the storing comprises:
   transmitting, by the host, a write command to the destination SSD; and
   storing, by the destination SSD, the copied data in response to the write command.

6. The copying method of claim 5, further comprising:
   transmitting, by the destination SSD, a result of the storing to the host.

7. A non-transitory computer-readable storage medium storing instructions that, when executed by a processor, cause the processor to perform the copying method of claim 1.

* * * * *